United States Patent
Zhan et al.

(10) Patent No.: US 11,077,391 B2
(45) Date of Patent: Aug. 3, 2021

(54) AUTOMATIC FLUSHING TYPE PRE-FILTERING DEVICE

(71) Applicant: XIAMEN FILTERTECH INDUSTRIAL CORPORATION, Xiamen (CN)

(72) Inventors: Feng-Shun Zhan, Xiamen (CN); Bo-Huang Liu, Xiamen (CN)

(73) Assignee: XIAMEN FILTERTECH INDUSTRIAL CORPORATION, Xiamen (CN)

( * ) Notice: Subject to any disclaimer, the term of this patent is extended or adjusted under 35 U.S.C. 154(b) by 147 days.

(21) Appl. No.: 16/533,457

(22) Filed: Aug. 6, 2019

(65) Prior Publication Data
US 2020/0061501 A1 Feb. 27, 2020

(30) Foreign Application Priority Data
Aug. 21, 2018 (CN) .......................... 201810955817.2

(51) Int. Cl.
*B01D 35/16* (2006.01)
*B01D 35/02* (2006.01)
*C02F 1/00* (2006.01)

(52) U.S. Cl.
CPC ............. *B01D 35/16* (2013.01); *B01D 35/02* (2013.01); *C02F 1/004* (2013.01); *C02F 2303/16* (2013.01)

(58) Field of Classification Search
CPC ...... B01D 35/16; B01D 35/02; B01D 29/668; B01D 29/15; C02F 1/004; C02F 2303/16; C02F 1/003; C02F 2307/06; C02F 2201/006
See application file for complete search history.

(56) References Cited

FOREIGN PATENT DOCUMENTS

EP 3213803 A1 * 9/2017 ............. B01D 29/70

* cited by examiner

*Primary Examiner* — Waqaas Ali
(74) *Attorney, Agent, or Firm* — Chun-Minh Shih; HDLS IPR Services

(57) ABSTRACT

Disclosed is an automatic flushing type pre-filtering device, that includes: a valve head set, a filter cartridge set, a movable rod piece, and a drain valve set. The filter cartridge set includes: a cylinder body; a filter cartridge, disposed in the cylinder body, the filter cartridge includes a filter net rack and a filter net disposed on the filter net rack. A first chamber is formed between the filter cartridge and the cylinder body, and a second chamber is formed inside the filter cartridge. The movable rod piece is provided with a hollow portion inside, and the movable rod piece is disposed in the second chamber. A water separation piece is disposed between the movable rod piece and the filter net rack. A plurality of through holes are disposed on the movable rod piece corresponding to a position of the second chamber.

9 Claims, 4 Drawing Sheets

AUTOMATIC FLUSHING TYPE PRE-FILTERING DEVICE

BACKGROUND OF THE INVENTION

Field of the Invention

The present invention relates to a pre-filtering device, and in particular to an automatic flushing type pre-filtering device.

The Prior Arts

In general, before reaching the users through the water pipe network as faucet water, the faucet water has to pass quite a lot of pipelines. Usually, impurities tend to exist in the pipeline, and if they are not filtered out properly, that could cause pollution to the water. Through using pre-filtering device to filter water supplied to user households, the secondary pollution can be avoided effectively, while solid impurities can be eliminated properly, to ensure user safety of using faucet water, and to reduce cost of maintenance.

However, in the existing technology, the automatic flushing type pre-filtering device is not capable of achieving back flushing, so that the impurities on the filter net can not be removed completely. As time goes by, the amount of impurities accumulated on the surface of the filter net could block the filter net, and even worse, water can not be output from the filtering device. The increased water pressure caused by blocking of the filter net could damage the filtering device. In this case, the filter net must be detached manually or replaced with a new one, to put the filtering device back to normal operation, hereby causing great inconvenience to the user.

Therefore, presently, the design and performance of the flushing pre-filtering device is not quite satisfactory, and it leaves much room for improvement.

SUMMARY OF THE INVENTION

In view of the problems and drawbacks of the prior art, the present invention provides an automatic flushing type pre-filtering device, to overcome the shortcomings of the prior art.

The present invention provides an automatic flushing type pre-filtering device, that includes: a valve head set, a filter cartridge set, a movable rod piece, and a drain valve set. The filter cartridge set includes: a cylinder body; a filter cartridge, disposed in the cylinder body, the filter cartridge includes a filter net rack and a filter net disposed on the filter net rack; a first chamber is formed between the filter cartridge and the cylinder body; and a second chamber is formed inside the filter cartridge. The movable rod piece is provided with a hollow portion inside, and the movable rod piece is disposed in the second chamber; a water separation piece is disposed between the movable rod piece and the filter net rack; a plurality of through holes are disposed on the movable rod piece corresponding to a position of the second chamber; a hollow portion and the second chamber are connected and in communication with each other through the through holes; a tight seal boss is disposed around an outer periphery of the movable rod piece, and the tight seal boss is located on an upper end of the water separation piece; a bulge ring is disposed between the movable rod piece and the cylinder body, to act in tight seal cooperation with the tight seal boss. The drain valve set is disposed at a lower end of the filter cartridge set.

In an aspect of the present invention, when the movable rod piece is moved upward, the tight seal boss and bulge ring are staggered to form a water passage channel, so that water flows into the first chamber through the water passage channel; and when the movable rod piece is moved downward, the tight seal boss and bulge ring are formed into tight seal cooperation, to block the water passage channel, so that water flows into the second chamber.

In another aspect of the present invention, the automatic flushing type pre-filtering device further comprise a spring adapted to sleeve around the water separation piece and the movable rod piece.

In yet another aspect of the present invention, the tight seal boss includes a first protrusion and a second protrusion, and an indent is formed between the first protrusion and the second protrusion, and a tight seal ring is disposed in the indent.

In a further aspect of the present invention, a height of the first protrusion is greater than that of the second protrusion, when the movable rod piece is moved downward, first protrusion is fastened to the bulge ring.

In an aspect of the present invention, a protrusion block is disposed at a bottom portion of the filter cartridge, and the protrusion block and the cylinder body are in tight seal connection. A blocking piece is connected to a bottom portion of the movable rod piece, such that the protrusion block acts in cooperation with the blocking piece, to open or close a waste water exit channel.

In another aspect of the present invention, the blocking piece includes a first blocking piece and a second blocking piece, the first blocking piece and the second blocking piece are connected in sequence to a bottom portion of the movable rod piece, and a diameter of the second blocking piece is greater than that of the filter cartridge.

In yet another aspect of the present invention, the bulge ring is disposed on the filter net rack, a gasket ring is disposed around an outer periphery of the bulge ring, the bulge ring is connected in tight seal to the cylinder body through using the gasket ring.

In a further aspect of the present invention, the movable rod piece includes a central rod, and a connection rod connected to a top end of the central rod, the central rod is of a filter net structure, and the tight seal boss is disposed around an outer periphery of the connection rod.

In another aspect of the present invention, valve head set includes: a three-way valve body, that includes plastic and metal sleeved around an outer periphery of the plastic; a steering valve cartridge, disposed on and is inserted into the three-way valve body; a rotation shaft, with its one end connected to an end of the steering valve cartridge; and a rotation button, disposed at the other end of the rotation shaft.

In the present invention, the automatic flushing type pre-filtering device utilizes the tight seal boss and the bulge ring acting in tight seal cooperation with each other, to realize flushing of the filter net, thus flushing the filter net more thoroughly, while prolonging the service life of the automatic flushing type pre-filtering device.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

Figure 1:
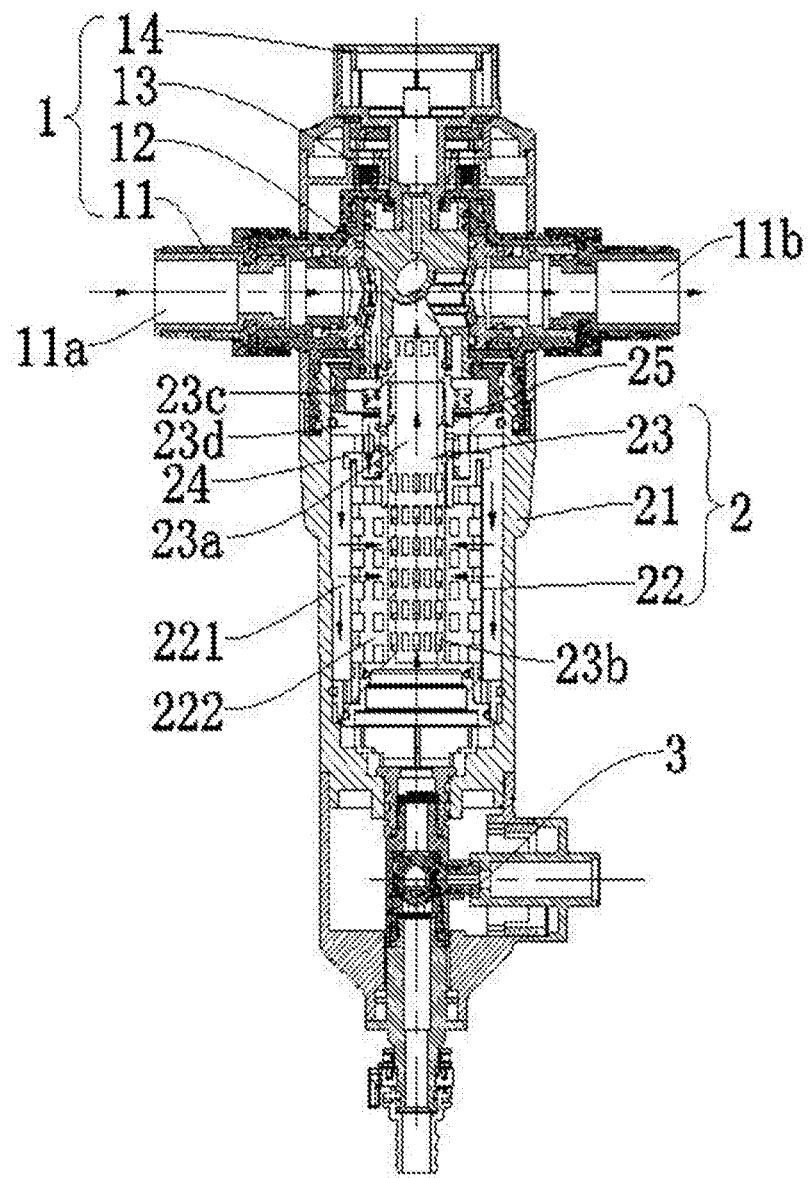
FIG. 1 is a cross section view of an automatic flushing type pre-filtering device in a first operation state according to an embodiment of the present invention.

The purpose, construction, features, functions and advantages of the present invention can be appreciated and understood more thoroughly through the following detailed descriptions with reference to the attached drawings.

Refer to FIGS. 1 to 4 respectively for a cross section view of an automatic flushing type pre-filtering device in a first operation state according to an embodiment of the present invention; a partial cross section view of an automatic flushing type pre-filtering device in a first operation state according to an embodiment of the present invention; a cross section view of an automatic flushing type pre-filtering device in a second operation state according to an embodiment of the present invention; and a partial cross section view of an automatic flushing type pre-filtering device in a second operation state according to an embodiment of the present invention.

As shown in FIGS. 1 to 4, the present invention provides an automatic flushing type pre-filtering device, that includes: a valve head set 1, a filter cartridge set 2, a movable rod piece 23, and a drain valve set 3 disposed at a lower end of the filter cartridge 22.

The valve head set 1 includes: a three-way valve body 11; a steering valve cartridge 12, disposed on and inserted into the three-way valve body 11, one end of the steering valve cartridge 12 is connected to a rotation shaft 13; a rotation shaft 13, with its one end connected to an end of the steering valve cartridge 12; and a rotation button 14, disposed at the other end of the rotation shaft 13. Preferably, the three-way valve body 11 includes plastic, and metal (for example, copper) sleeved around an outer periphery of the plastic. Through this kind of design, it could prevent heavy metals such as lead from releasing into water, when water flows through the three-way valve body 11, thus it could avoid the filtered water from the secondary pollution.

The filter cartridge set 2 includes: a cylinder body 21; a filter cartridge 22, disposed in the cylinder body 21; and a movable rod piece 23 having a hollow portion 23a. A first chamber 221 is formed between the filter cartridge 22 and the cylinder body 21, and a second chamber 222 is formed inside the filter cartridge 22. The movable rod piece 23 is disposed in the second chamber 222, and is separated from the second chamber 222 by a distance.

The filter cartridge 22 includes a filter net rack 22a and a filter net 22b disposed on the filter net rack 22a, A water separation piece 24 is disposed between the movable rod piece 23 and the filter net rack 22a.

A plurality of through holes 23b are disposed on the movable rod piece 23 corresponding to a position of the second chamber 222. A hollow portion 23a of the movable rod piece 23 and the second chamber 222 are connected and in communication with each other through the through holes 23b. A tight seal boss 23c is disposed around an outer periphery of the movable rod piece 23, and the tight seal boss 23c is located on an upper end of the water separation piece 24. A bulge ring 23d is disposed between the movable rod piece 23 and the cylinder body 21, to act in tight seal cooperation with the tight seal boss 23c. The bulge ring 23d is disposed above the water separation piece 24, and is connected to and in communication with the first chamber 22 separated by a distance, Preferably, the movable rod piece 23 includes a central rod 231, and a connection rod 232 connected to a top end of the central rod 231. The central rod 231 is of a filter net structure (that includes a second filter net rack and a second filter net disposed on the second filter net rack, to act in cooperation with the filter cartridge 22, to filter water more effectively). The tight seal boss 23c is disposed around an outer periphery of the connection rod 232, to achieve installation and detaching more efficiently.

Figure 2:
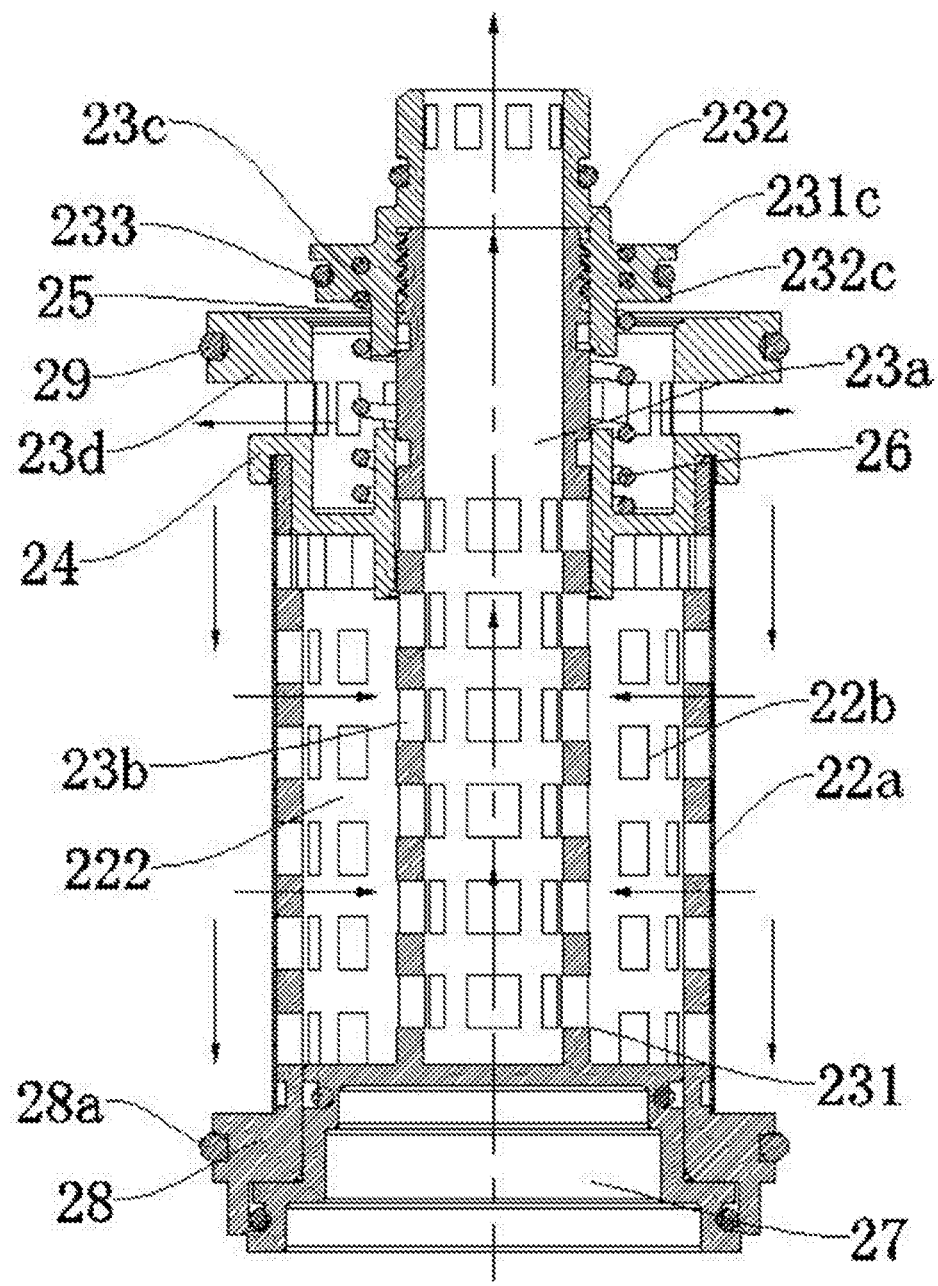
FIG. 2 is a partial cross section view of an automatic flushing type pre-filtering device in a first operation state according to an embodiment of the present invention.
Figure 4:
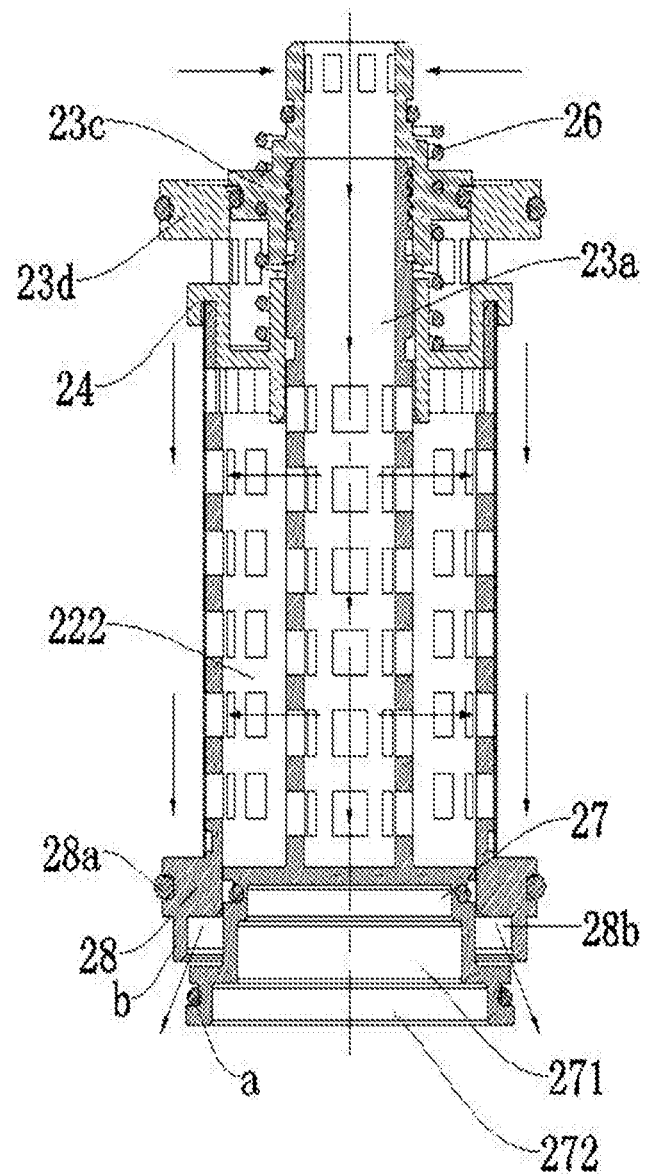
FIG. 4 is a partial cross section view of an automatic flushing type pre-filtering device in a second operation state according to an embodiment of the present invention.

Refer to FIG. 2, when the movable rod piece 23 is moved upward, the tight seal boss 23c and bulge ring 23d are staggered to form a water passage channel 25, so that water flows into the first chamber 221 through the water passage channel 25; and refer to FIG. 4, when the movable rod piece 23 is moved downward, the tight seal boss 23c and bulge ring 23d are formed into tight seal cooperation, to block the water passage channel 25, so that water flows into the second chamber 222 or the hollow portion 23a. In the present invention, the automatic flushing type pre-filtering device utilizes tight seal cooperation between the tight seal boss 23c and the bulge ring 24d, to realize front flushing and back flushing of the filter net 22b, thus flushing and cleaning the filter net more thoroughly, while prolonging the service life of the automatic flushing type pre-filtering device.

By way of example, refer to FIG. 4, a spring 26 is adapted to sleeve around the water separation piece 24 and the movable rod piece 23. A blocking piece 27 is connected to a bottom portion of the movable rod piece 23. A protrusion block 28 is disposed at a bottom portion of the filter cartridge 22, and the protrusion block 28 and the cylinder body 21 are in tight seal connection (for example, the protrusion block 28 is sleeved around by a second tight seal ring 28a, to form in tight seal connection with the cylinder body 21). The protrusion block 28 acts in cooperation with the blocking piece 27, to open and close the waste water exit channel 28b.

The blocking piece 27 includes a first blocking piece 271 and a second blocking piece 272, the first blocking piece 271 and the second blocking piece 272 are connected in sequence to a bottom portion of the movable rod piece 23, and a diameter of the second blocking piece 272 is greater than that of the filter cartridge 22, so that when the blocking piece 27 is moved up to a certain height, it is fastened onto the protrusion block 28. Further, a third tight seal ring a can be sleeved around the outer periphery of the second blocking piece 272, and the protrusion block 28 is provided with an extension portion b. The cooperation between the third tight seal ring a and the protrusion block 28 enables better blocking of the waste water exit channel.

When the automatic flushing type pre-filtering device is in a first operation state (for example, a filtering state), refer to FIGS. 1 and 2, the drain valve set 3 is closed, the movable rod piece 23 is moved upward due to the action of the spring 26. The tight seal boss 23c and bulge ring 23d are staggered to form a water passage channel 25. At the same time, the blocking piece 27 located at the bottom of the movable rod piece 23 is moved upward, to close the waste water exit channel 28b. At this time, raw water flows into a water inlet port 11a of the three-way valve body 11, then to the water passage channel 25, the first chamber 221, the second chamber 22, and a hollow portion 23a in sequence. Finally, the purified water flows out of the water outlet port 11b of the three-way valve body 11.

Figure 3:
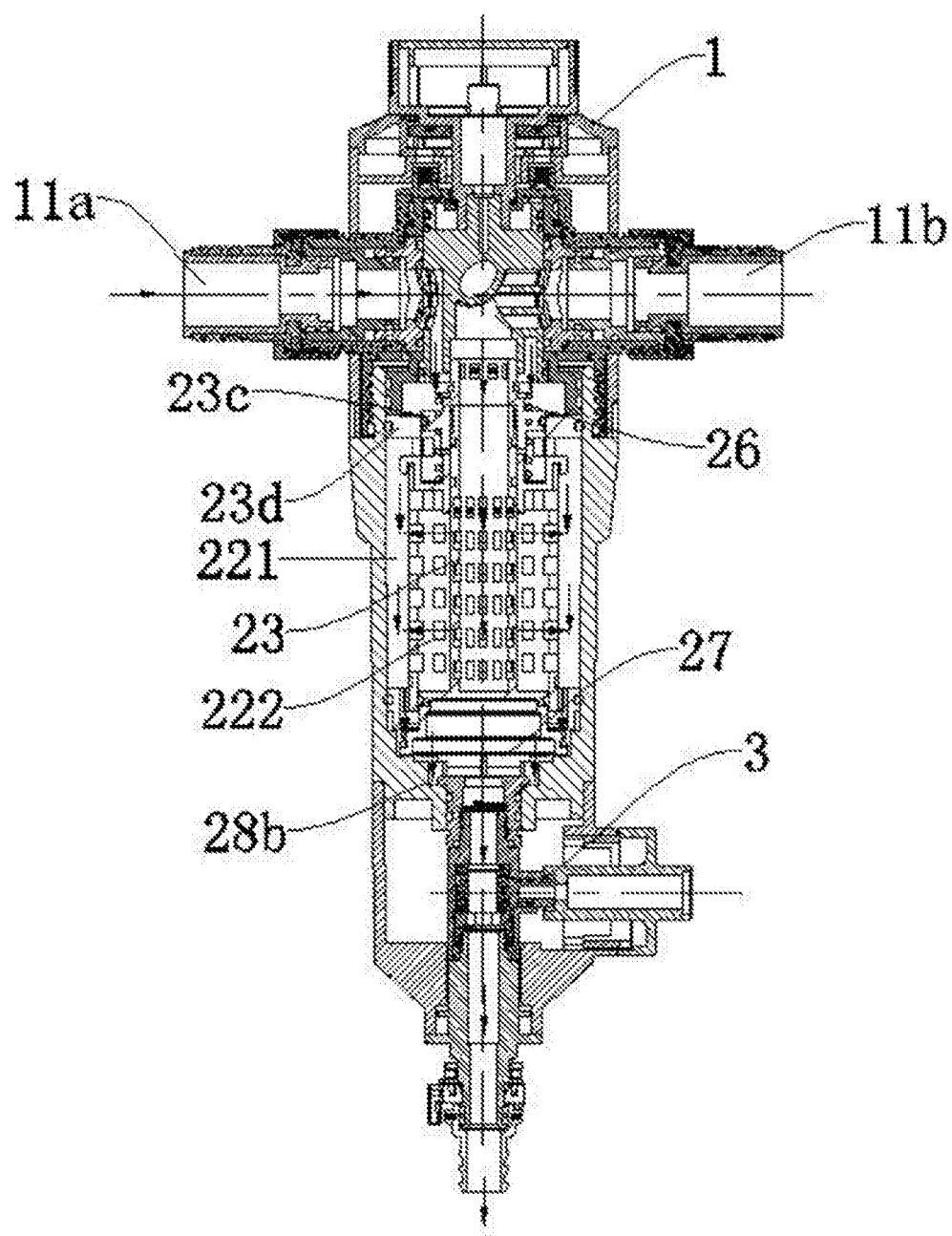
FIG. 3 is a cross section view of an automatic flushing type pre-filtering device in a second operation state according to an embodiment of the present invention.

When the automatic flushing type pre-filtering device is in a second operation state (for example, a flushing state), refer to FIGS. 3 and 4, the drain valve set 3 is opened, the water outlet port 11b of the three-way valve body 11 is in a closed state. The movable rod piece 23 is moved downward due to the water pressure by overcoming the action force of the spring 26. The tight seal boss 23c and bulge ring 23d act in tight seal cooperation, to block the water passage channel 25. At the same time, the blocking piece 27 located at the bottom of the movable rod piece 23 is moved downward, to open the waste water exit channel 28b. At this time, raw water flows into a water inlet port 11a of the three-way valve body 11, then it flows to the second chamber 222, the first chamber 221 in sequence. Finally, waste water flows out of the drain valve set 3 through the waste water exit channel 28b. Alternatively, the up and down movements of the movable rod piece 23 can be realized through connection and cooperation of the movable rod piece 23 and the valve head set 1, without the need of using pressure and spring 26. In the present invention, the up and down movements of the movable rod piece 23 can be used to achieve switching between filtering and back flushing. Meanwhile, the automatic flushing type pre-filtering device is capable of opening and closing the waste water exit channel 28b, thus it is simple in construction, to realize switching of water channels effectively.

The details of the tight seal boss 23c and the bulge ring 23d are explained as follows. The bulge ring 23d utilizes the gap between the top portion of the filter net rack 22a and the water separation piece 24 to form a water passage channel 25 (namely, the bulge ring 23d is located above the filter net rack 22a). The gasket ring 29 is sleeved around the outer periphery of the bulge ring 23d. The bulge ring 23d utilizes the gasket ring 29, to be connected to the cylinder body 21 in tight seal. Alternatively, The bulge ring 23d and the cylinder body 21 can be formed integrally into a body, or bulge ring 23d and the cylinder body 21 can be put onto a three-way valve body 11, as long as the bulge ring 23d can be adapted to act in cooperation with the tight seal boss 23c. In this regard, the tight seal boss 23c. includes a first protrusion 231c and a second protrusion 232c, an indent is formed between the first protrusion 231c and the second protrusion 232c, and a tight seal ring 233 is disposed in the indent. Wherein, the protrusion height of the first protrusion 231c is greater than that of second protrusion 232c. When the movable rod piece 23 is moved downward, the first protrusion 231c is fastened in the bulge ring 23d, to prevent the movable rod piece 23 from being detached due to moving too much, thus ensuring the reliability of its structure and operation.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An automatic flushing type pre-filtering device, comprising:
    a valve head set,
    a filter cartridge set, including:
        a cylinder body,
        a filter cartridge, disposed in the cylinder body, the filter cartridge includes a filter net rack and a filter net disposed on the filter net rack, a first chamber is formed between the filter cartridge and the cylinder body, and a second chamber is formed inside the filter cartridge, and
        a movable rod piece, having a hollow portion inside, and the movable rod piece is disposed in the second chamber, a water separation piece is disposed between the movable rod piece and the filter net rack, a plurality of through holes are disposed on the movable rod piece corresponding to a position of the second chamber, the hollow portion and the second chamber are connected and in communication with each other through the through holes, a seal boss is disposed around an outer periphery of the movable rod piece, and the seal boss is located on an upper end of the water separation piece, a bulge ring is disposed between the movable rod piece and the cylinder body, to act in a seal cooperation with the seal boss;
    a drain valve set, disposed at a lower end of the filter cartridge set; and
    a spring, to sleeve around the water separation piece and the movable rod piece.

2. The automatic flushing type pre-filtering device as claimed in claim 1, wherein when the movable rod piece is moved upward, the seal boss and bulge ring are staggered to form a water passage channel, so that water flows into the first chamber through the water passage channel; and when the movable rod piece is moved downward, the seal boss and bulge ring are formed into the seal cooperation, to block the water passage channel, so that water flows into the second chamber.

3. The automatic flushing type pre-filtering device as claimed in claim 1, wherein the seal boss includes a first protrusion and a second protrusion, and an indent is formed between the first protrusion and the second protrusion, and a seal ring is disposed in the indent.

4. The automatic flushing type pre-filtering device as claimed in claim 3, wherein the height of the first protrusion is greater than that of the second protrusion, when the movable rod piece is moved downward, the first protrusion is fastened to the bulge ring.

5. The automatic flushing type pre-filtering device as claimed in claim 1, wherein a protrusion block is disposed at a bottom portion of the filter cartridge, and the protrusion block and the cylinder body are in a #t connection, a blocking piece is connected to a bottom portion of the movable rod piece, such that the protrusion block acts in cooperation with the blocking piece, to open or close a waste water exit channel.

6. The automatic flushing type pre-filtering device as claimed in claim 5, wherein the blocking piece includes a first blocking piece and a second blocking piece, the first blocking piece and the second blocking piece are connected in sequence to the bottom portion of the movable rod piece, and a diameter of the second blocking piece is greater than that of the filter cartridge.

7. The automatic flushing type pre-filtering device as claimed in claim 1, wherein the bulge ring is disposed on the filter net rack, a gasket ring is disposed around an outer periphery of the bulge ring, the bulge ring is connected the cylinder body through using the gasket ring.

8. The automatic flushing type pre-filtering device as claimed in claim 1, wherein the movable rod piece includes a central rod, and a connection rod connected to a top end of the central rod, the central rod is of a filter net structure, and the seal boss is disposed around an outer periphery of the connection rod.

9. The automatic flushing type pre-filtering device as claimed in claim 1, wherein the valve head set includes:
   a three-way valve body, including plastic and metal sleeved around an outer periphery of the plastic;
   a steering valve cartridge, disposed on and is inserted into the three-way valve body;
   a rotation shaft, with its one end connected to an end of the steering valve cartridge; and
   a rotation button, disposed at the other end of the rotation shaft.

* * * * *